United States Patent
Kashima et al.

(10) Patent No.: US 11,483,289 B2
(45) Date of Patent: Oct. 25, 2022

(54) MANAGEMENT SYSTEM AND MANAGEMENT METHOD

(71) Applicant: NIPPON TELEGRAPH AND TELEPHONE CORPORATION, Tokyo (JP)

(72) Inventors: Shingo Kashima, Musashino (JP); Masami Ueno, Musashino (JP); Tetsuhiko Murata, Musashino (JP); Tsuyoshi Kondo, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 147 days.

(21) Appl. No.: 16/975,396

(22) PCT Filed: Feb. 26, 2019

(86) PCT No.: PCT/JP2019/007393
§ 371 (c)(1),
(2) Date: Aug. 25, 2020

(87) PCT Pub. No.: WO2019/167969
PCT Pub. Date: Sep. 6, 2019

(65) Prior Publication Data
US 2020/0403975 A1 Dec. 24, 2020

(30) Foreign Application Priority Data
Feb. 27, 2018 (JP) .............................. JP2018-033919

(51) Int. Cl.
*H04L 9/40* (2022.01)
*H04L 12/66* (2006.01)
*H04L 41/22* (2022.01)

(52) U.S. Cl.
CPC .......... *H04L 63/0263* (2013.01); *H04L 12/66* (2013.01); *H04L 41/22* (2013.01)

(58) Field of Classification Search
CPC ..... H04L 63/0263; H04L 12/66; H04L 41/22; H04L 41/0806; H04L 43/028
See application file for complete search history.

(56) References Cited

U.S. PATENT DOCUMENTS

| | | | | |
|---|---|---|---|---|
| 2004/0003290 A1* | 1/2004 | Malcolm | ............ | H04L 63/0263 726/28 |
| 2005/0240758 A1* | 10/2005 | Lord | ................... | H04L 63/0263 713/153 |
| 2006/0174337 A1* | 8/2006 | Bernoth | ............. | H04L 63/0263 726/11 |

FOREIGN PATENT DOCUMENTS

| | | |
|---|---|---|
| JP | 2008-78822 A | 4/2008 |
| JP | 2010-98706 A | 4/2010 |

OTHER PUBLICATIONS

Sales, Thiago, et al. "A UPnP extension for enabling user authentication and authorization in pervasive systems." Journal of the Brazilian Computer Society 16.4: 261-277. (Year: 2010).*

(Continued)

*Primary Examiner* — John M Macilwinen
(74) *Attorney, Agent, or Firm* — Xsensus LLP

(57) ABSTRACT

A gateway device (10) stores therein a first filtering rule and a second filtering rule for filtering packets which are transmitted from a terminal (20) in a network (2) as a transmission source to a terminal (20) in a network (3) as a destination. The gateway device (10) acquires, on the basis of a packet transmitted from the terminal (20) in the network (3), identification information for identifying the terminal (20). The gateway device (10) notifies a management device (30) of the acquired identification information. The management device (30) generates a management screen on the (Continued)

| PROTOCOL | TRANSMISSION SOURCE ADDRESS | TRANSMISSION SOURCE PORT NUMBER | DESTINATION ADDRESS | DESTINATION PORT NUMBER | OPERATION |
|---|---|---|---|---|---|
| tcp | 100.64.100.99 | any | 192.168.1.11 | any | SECOND FILTERING RULE |
| tcp | 100.64.100.99 | any | 192.168.1.12 | any | SECOND FILTERING RULE |
| all | 0.0.0.0/0 | any | 0.0.0.0/0 | any | DENY | basis of the notified information, and transmits the management screen to a display device (40). The management device (30) transmits an instruction based on input to the display device (40) to the gateway device (10). The gateway device (10) sets the first filtering rule on the basis of the instruction from the management device (30).

16 Claims, 12 Drawing Sheets

(56) References Cited

OTHER PUBLICATIONS

Erbacher, Robert F., and Menashe Garber. "Real-Time Interactive Visual Port Monitoring and Analysis." Security and Management. (Year: 2005).*

M. Boucadair, et al.—Internet Engineering Task Force (IETF), "Universal Plug and Play (UPnP) Internet Gateway Device—Port Control Protocol Interworking Function (IGD-PCP IWF)", Jul. 2013, https://tools.ietf.org/html/rfc6970, 23 pp.

* cited by examiner

Fig. 3

| PROTOCOL | BEFORE CONVERSION | | AFTER CONVERSION | |
|---|---|---|---|---|
| | DESTINATION ADDRESS | DESTINATION PORT NUMBER | DESTINATION ADDRESS | DESTINATION PORT NUMBER |
| tcp | 100.64.1.1 | 8080 | 192.168.1.11 | 80 |
| tcp | 100.64.1.1 | 8443 | 192.168.1.12 | 443 |

Fig. 4

| PROTOCOL | TRANSMISSION SOURCE ADDRESS | TRANSMISSION SOURCE PORT NUMBER | DESTINATION ADDRESS | DESTINATION PORT NUMBER | OPERATION |
|---|---|---|---|---|---|
| tcp | 100.64.100.99 | any | 192.168.1.11 | any | SECOND FILTERING RULE |
| tcp | 100.64.100.99 | any | 192.168.1.12 | any | SECOND FILTERING RULE |
| all | 0.0.0.0/0 | any | 0.0.0.0/0 | any | DENY |

Fig. 5

| PROTOCOL | TRANSMISSION SOURCE ADDRESS | TRANSMISSION SOURCE PORT NUMBER | DESTINATION ADDRESS | DESTINATION PORT NUMBER | OPERATION |
|---|---|---|---|---|---|
| tcp | 0.0.0.0./0 | any | 192.168.1.11 | 80 | ALLOW |
| tcp | 0.0.0.0./0 | any | 192.168.1.12 | 443 | ALLOW |

Fig. 8

MANAGEMENT SCREEN

| TERMINAL IDENTIFICATION INFORMATION [MANUFACTURER NAME, MODEL NAME, OS NAME, HOST NAME] | INFORMATION EXTRACTED FROM CONVERSION RULE | INFORMATION EXTRACTED FROM SECOND FILTERING RULE | FIRST FILTERING RULE |
|---|---|---|---|
| COMPANY A, XXX , Windows 10 , tanmatsu1 | tcp/8080→tcp/80 | tcp/80 ALLOW | 100.64.100.99 ALLOW  [DELETE] [ADD]  [          ] ALL DENY |
| COMPANY B, YYY , Linux , tanmatsu2 | tcp/8443→tcp/443 | tcp/443 ALLOW | [ADD]  [          ] ALL DENY |

42

MANAGEMENT SYSTEM AND MANAGEMENT METHOD

CROSS-REFERENCE TO RELATED APPLICATIONS

The present application is based on PCT filing PCT/JP2019/007393, filed Feb. 26, 2019, which claims priority to JP 2018-033919, filed Feb. 27, 2018, the entire contents of each are incorporated herein by reference.

TECHNICAL FIELD

The present invention relates to a management system and a management method.

BACKGROUND ART

As a method for setting a filtering rule for allowing a home gateway to access a LAN (Local Area Network) from a WAN (Wide Area Network), a method for setting filtering by a UPnP (Universal Plug and Play) IGD (Internet Gateway Device) has been conventionally known.

CITATION LIST

Non Patent Literature

[NPL 1] RFC6970 Universal Plug and Play (UPnP) Internet Gateway Device-Port Control Protocol Interworking Function (IGD-PCP IWF), [online], [searched on 17 Feb. 2018], Internet (https://tools.ietf.org/html/rfc6970)

SUMMARY OF THE INVENTION

Technical Problem

The conventional method, however, has a problem in that it may be difficult to easily set a filtering rule for preventing unauthorized accesses for a home gateway. For example, in order for an UPnP IGD to set filtering for preventing unauthorized accesses, it is necessary for a terminal at an access destination to grasp an IP address of an access source in advance. However, it is difficult for the terminal at the access destination to grasp the IP address of the access source in advance, and hence in the filtering setting by the UPnP IGD, only filtering setting for allowing an access from a particular IP address is implemented, and an unauthorized access may be made.

Means for Solving the Problem

In order to solve the above-mentioned problems and achieve the object, a management system of the present invention includes: a gateway device for filtering and transferring a packet between a first network and a second network; and a management device for managing the gateway device, the gateway device including: a storage unit that stores therein a first filtering rule and a second filtering rule for filtering packets which are transmitted from a terminal in the first network as a transmission source to a terminal in the second network as a destination; an acquisition unit that acquires, on the basis of a packet transmitted from a second terminal in the second network, identification information for identifying the second terminal; a notification unit that notifies the management device of the identification information on the second terminal acquired by the acquisition unit; and a setting unit that sets the first filtering rule for the second terminal on the basis of an instruction from the management device, the management device including: a generation unit that generates, on the basis of the identification information on the second terminal notified from the notification unit, a management screen for managing the first filtering rule for the second terminal, and transmitting the generated management screen to a predetermined display device; and an instruction unit that instructs the gateway device to set the first filtering rule for the second terminal on the basis of input to the management screen through the display device.

Effects of the Invention

According to the present invention, a filtering rule for preventing an unauthorized access can be easily set for a home gateway at low cost.

BRIEF DESCRIPTION OF DRAWINGS

FIG. 3 is a diagram illustrating an example of a conversion table according to the first embodiment.

FIG. 4 is a diagram illustrating an example of a first filtering rule according to the first embodiment.

FIG. 5 is a diagram illustrating an example of a second filtering rule according to the first embodiment.

FIG. 8 is a diagram illustrating an example of a management screen according to the first embodiment.

DESCRIPTION OF EMBODIMENTS

Embodiments of a management system and a management method according to this application are described in detail below with reference to the drawings. The present invention is not limited by the embodiments described below.

Configuration of Management System in First Embodiment

Figure 1:
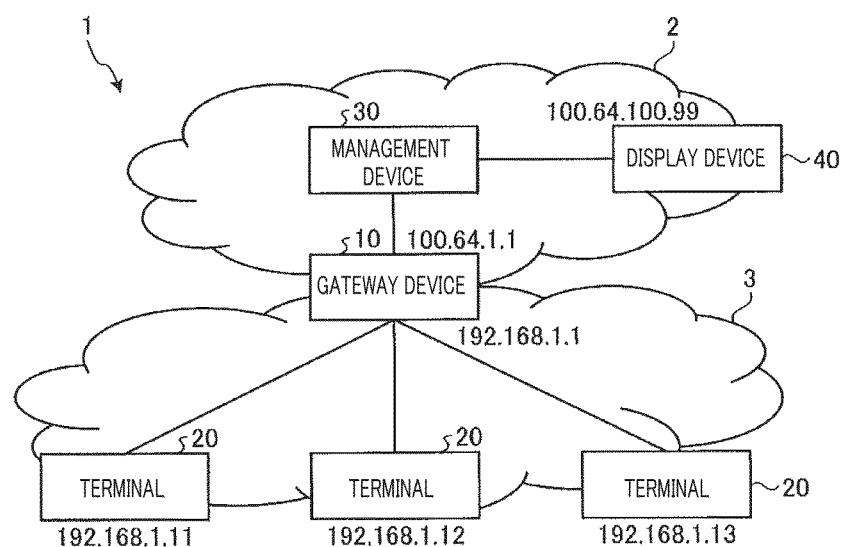
FIG. 1 is a diagram illustrating an example of a configuration of a management system according to a first embodiment.

First, a configuration of a management system according to a first embodiment is described with reference to FIG. 1. FIG. 1 is a diagram illustrating an example of the configuration of the management system according to the first embodiment. As illustrated in FIG. 1, a management system 1 includes a gateway device 10, terminals 20, a management device 30, and a display device 40.

The gateway device 10 filters and transfers packets between a network 2 and a network 3. The management device 30 manages the gateway device 10. For example, the network 2 is a public network. For example, the network 3 is a local network. The network 2 is an example of a first network. The network 3 is an example of a second network.

In the gateway device 10, "100.64.1.1" is set as an address on the network 2 side. In the gateway device 10, "192.168.1.1" is set as an address on the network 3 side. As addresses of the three terminals 20, "192.168.1.11", "192.168.1.12", and "192.168.1.13" are set, respectively. As an address of the display device 40, "100.64.100.99" is set.

The management device 30 generates a management screen for managing a filtering rule used by the gateway device 10 on the basis of information acquired from the gateway device 10. The display device 40 displays the management screen generated by the management device 30, and receives input through the management screen.

In the example in FIG. 1, one management device 30 corresponds to one gateway device 10, but one management device 30 may correspond to a plurality of gateway devices 10. The safety of communication between the gateway device 10 and the management device 30 is secured by a physical or virtual closed network.

In communication between the management device 30 and the display device 40, user authentication for confirming that a user of the display device 40 is a legitimate user of the gateway device 10 is performed. In the management system 1, the user can instruct the settings of the gateway device 10 through the management screen displayed on the display device 40.

Configuration of Gateway Device in First Embodiment

Figure 2:
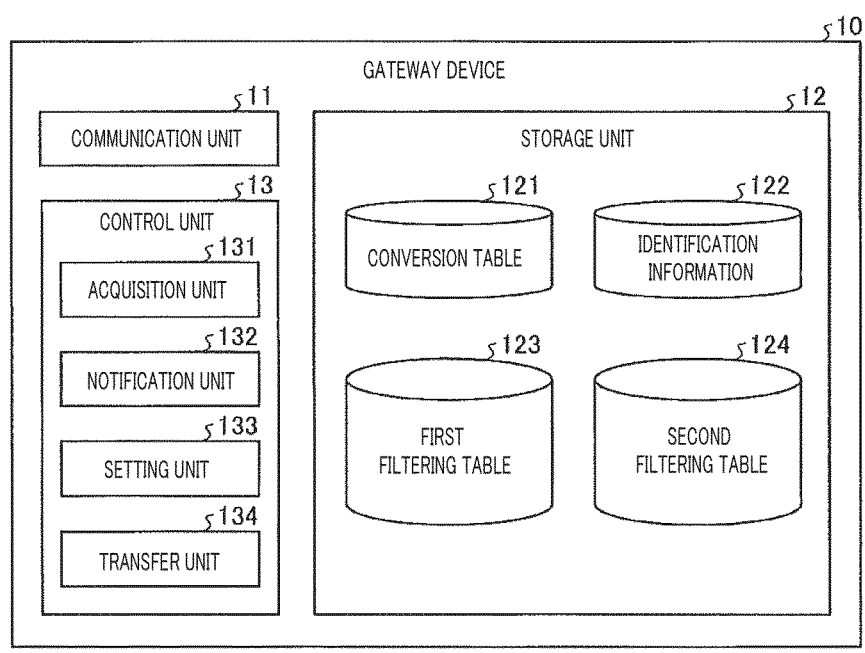
FIG. 2 is a diagram illustrating an example of a configuration of a gateway device according to the first embodiment.

Referring to FIG. 2, the configuration of the gateway device 10 is described. FIG. 2 is a diagram illustrating an example of the configuration of the gateway device according to the first embodiment. As illustrated in FIG. 2, the gateway device 10 includes a communication unit 11, a storage unit 12, and a control unit 13.

The communication unit 11 communicates data with another device through a network. For example, the communication unit 11 is an NIC (Network Interface Card). The communication unit 11 can communicate with a device connected to the network 2 and a device connected to the network 3.

The storage unit 12 is a storage device such as an HDD (Hard Disk Drive), an SSD (Solid State Drive), or an optical disc. The storage unit 12 may be a data rewritable semiconductor memory such as a RAM (Random Access Memory), a flash memory, or an NVSRAM (Non Volatile Static Random Access Memory). The storage unit 12 stores therein an OS (Operating System) and various kinds of programs executed by the gateway device 10. The storage unit 12 further stores therein various kinds of information used to execute the programs. The storage unit 12 stores therein a conversion table 121, identification information 122, a first filtering table 123, and a second filtering table 124.

In the conversion table 121, a conversion rule is stored. The conversion rule is a rule used for the gateway device 10 to convert information on a destination or a transmission source of a packet transferred between the network 2 and the network 3.

FIG. 3 is a diagram illustrating an example of the conversion table according to the first embodiment. As illustrated in FIG. 3, in the conversion table 121, a protocol, a destination address before conversion, a destination port number before conversion, a destination address after conversion, and a destination port number after conversion are stored.

For example, as illustrated in FIG. 3, in the first row of the conversion table 121, a protocol "tcp", a destination address before conversion "100.64.1.1", a destination port number before conversion "8080", a destination address after conversion "192.168.1.11", and a destination port number after conversion "80".

In this case, when the gateway device 10 receives a packet with a TCP protocol for which a destination address "100.64.1.1" and a destination port number "8080" are set from the network 2 side, the gateway device 10 changes the destination address and the destination port number to "192.168.1.11" and "80", respectively, and transfers the packet to a corresponding terminal 20 in the network 3.

On the other hand, when the gateway device 10 receives a packet with a TCP protocol for which a transmission source address "192.168.1.11" and a transmission source port number "80" are set from the network 3 side, the gateway device 10 changes the destination address and the destination port number to "100.64.1.1" and "8080", respectively, and transfers the packet to the network 2.

The identification information 122 is information for identifying the terminal 20. The identification information 122 is acquired by the gateway device 10 on the basis of a packet transmitted by the terminal 20. For example, the identification information 122 includes hardware information such as a manufacturer, a model, and a model number. For example, the identification information 122 includes software information such as an OS and firmware. The identification information 122 includes information such as a host name set for the terminal 20.

In the first filtering table 123, a first filtering rule is stored. The first filtering rule is a filtering rule that can be set by operation of the user through the management device 30 and the display device 40 among filtering rules for packets used by the gateway device 10.

FIG. 4 is a diagram illustrating an example of the first filtering rule according to the first embodiment. As illustrated in FIG. 4, in the first filtering table 123, a protocol, a transmission source address, a transmission source port number, a destination address, a destination port number, and an operation are stored.

For example, as illustrated in FIG. 4, in the first row of the first filtering table 123, a protocol "tcp", a transmission source address "100.64.100.99", a transmission source port number "any", a destination address "192.168.1.11", a destination port number "any", and an operation "second filtering rule" are stored. Note that "any" indicates any value.

In this case, when the gateway device 10 receives a packet with a TCP protocol for which a transmission source address "100.64.100.99" and a destination address "192.168.1.11" are set, the gateway device 10 determines "second filtering rule" as the operation for the packet. The operation "second filtering rule" means that the transfer is allowed by the first filtering rule, and whether the packet can be transferred is further determined by using the second filtering rule. The operation "deny" means that the transfer of the packet is denied.

The first filtering rule may be set such that a packet for a malicious address published as a black list is denied.

When determining whether a packet can be transferred, the gateway device 10 searches the first filtering table 123 from the top in order. In other words, in the example in FIG. 4, even a packet in which operation "deny" is determined by a condition in the third row is allowed to be transferred when matching a condition in the first or second row.

In the second filtering table 124, a second filtering rule is stored. The second filtering rule is a filtering rule set in advance among filtering rules for packets used by the gateway device 10.

FIG. 5 is a diagram illustrating an example of the second filtering rule according to the first embodiment. As illustrated in FIG. 5, in the second filtering table 124, a protocol, a transmission source address, a transmission source port number, a destination address, a destination port number, and an operation are stored.

For example, as illustrated in FIG. 5, in the first row of the second filtering table 124, a protocol "tcp", a transmission source address "0.0.0.0/0", a transmission source port number "any" a destination address "192.168.1.11", a destination port number "80", and an operation "allow" are stored. In this case, when the gateway device 10 receives a packet with a TCP protocol for which a destination address "192.168.1.11" and a destination port number "80" are set, the gateway device 10 determines "allow" as the operation for the packet.

The control unit 13 controls the overall gateway device 10. For example, the control unit 13 is an electronic circuit such as a CPU (Central Processing Unit) or an MPU (Micro Processing Unit), or an integrated circuit such as an ASIC (Application Specific Integrated Circuit) or an FPGA (Field Programmable Gate Array). The control unit 13 has an internal memory for storing therein programs defining various processing procedures and control data, and executes the processing by using the internal memory. The control unit 13 functions as various processing units when various programs operate. For example, the control unit 13 includes an acquisition unit 131, a notification unit 132, a setting unit 133, and a transfer unit 134.

The acquisition unit 131 acquires, on the basis of a packet transmitted from a terminal 20 in the network 3, identification information 122 for identifying the terminal 20. The acquisition unit 131 acquires, on the basis of a packet that is not allowed to be transferred to a terminal 20 in the network 3 in accordance with the second filtering rule, identification information 122 on the terminal 20 as the destination of the packet.

The acquisition unit 131 may acquire the identification information 122 on the basis of a response packet for a packet transmitted from the gateway device 10 to the terminal 20 or on the basis of a packet spontaneously transmitted by the terminal 20. The acquisition unit 131 may acquire the identification information 122 by using a Description message of a UPnP transmitted by the terminal 20, or may acquire the identification information 122 by collating a packet transmitted by the terminal with dictionary data held in advance.

The notification unit 132 notifies the management device 30 of the identification information 122 on the terminal 20 acquired by the acquisition unit 131. The notification unit 132 can further notify the management device 30 of a second filtering rule for the terminal 20. The notification unit 132 can further notify the management device 30 of a conversion rule for the terminal 20. The notification unit 132 can notify the management device 30 of the identification information 122 acquired by the acquisition unit 131 and a transmission source address of the packet.

The setting unit 133 sets the first filtering rule for the terminal 20 on the basis of an instruction from the management device 30. For example, the setting unit 133 can add and delete the first filtering rule.

The setting unit 133 can add a second filtering rule for allowing, on the basis of a packet transmitted from a terminal 20 in the network 3, a packet having a particular protocol and a particular destination port number to be transferred to the terminal 20. The setting unit 133 can add a conversion rule for converting a destination address and a destination port number of a predetermined packet transmitted to the network 3 to an address and a particular destination port number of the terminal 20. In this manner, the setting unit 133 can automatically add a conversion rule and a second filtering rule.

The transfer unit 134 filters and transfers packets which are transmitted from the network 2 as a transmission source to the network 3 as a destination. In this case, the transfer unit 134 can allow the transfer of packets for which operation determined based on the second filtering rule is "allow" among packets for which operation determined based on the first filtering rule is "second filtering rule".

The transfer unit 134 filters and transfers packets which are transmitted from the network 3 as a transmission source to the network 2 as a destination. The transfer unit 134 may always allow the transfer of packets which are transmitted from a terminal 20 in the network 3 as a transmission source to the network 2 as a destination.

The instruction unit 332 can instruct the gateway device 10 to set the first filtering rule for the terminal 20 on the basis of input through instant message service. Consequently, a user can easily input the setting instruction.

Configuration of Management Device in First Embodiment

Figure 6:
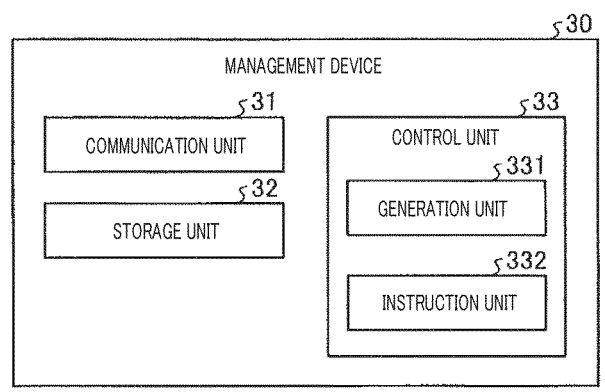
FIG. 6 is a diagram illustrating an example of a configuration of a management device according to the first embodiment.

Next, the configuration of the management device 30 is described with reference to FIG. 6. FIG. 6 is a diagram illustrating an example of the configuration of the management device according to the first embodiment. As illustrated in FIG. 6, the management device 30 includes a communication unit 31, a storage unit 32, and a control unit 33.

The communication unit 31 communicates data with another device through a network. For example, the communication unit 31 is a NIC. The communication unit 31 can communicate with the gateway device 10 and the display device 40.

The storage unit 32 is a storage device such as an HDD, an SSD, or an optical disc. The storage unit 32 may be a data rewritable semiconductor memory such as a RAM, a flash memory, or an NVSRAM. The storage unit 32 stores therein an OS and various kinds of programs executed by the gateway device 10. The storage unit 32 further stores therein various kinds of information used to execute the programs.

The control unit 33 controls the overall management device 30. For example, the control unit 33 is an electronic circuit such as a CPU or an MPU or an integrated circuit such as an ASIC or an FPGA. The control unit 33 has an internal memory for storing therein programs defining various processing procedures and control data, and executes the processing by using the internal memory. The control unit 33 functions as various processing units when various programs operate. For example, the control unit 33 includes a generation unit 331 and an instruction unit 332.

The generation unit 331 generates, on the basis of identification information 122 on a terminal 20 notified from the notification unit 132, a management screen for managing a first filtering rule for the terminal 20, and transmits the generated management screen to a predetermined display device 40.

FIG. 8 is a diagram illustrating an example of the management screen according to the first embodiment. As illustrated in FIG. 8, the generation unit 331 can display information notified from the notification unit 132 in the gateway device 10 on the management screen.

The generation unit 331 can display information on a second filtering rule notified from the notification unit 132 on the management screen. The generation unit 331 can display information on a conversion rule notified from the notification unit 132 on the management screen.

The generation unit 331 displays, on the management screen, a button for instructing the addition of the transmission source address notified by the notification unit 132 and a first filtering rule for allowing a packet transmitted from the transmission source address to be transferred. The generation unit 331 may display, on the management screen, reverse domain name system (DNS) lookup information or WHOIS information on a transmission source address for which the first filtering rule is managed.

As illustrated in FIG. 8, terminal identification information, information extracted from the conversion rule, information extracted from the second filtering rule, and the first filtering rule are displayed on the management screen. The information extracted from the conversion rule and the information extracted from the second filtering rule are displayed when its original information is notified by the notification unit 132.

The instruction unit 332 instructs the gateway device 10 to set the first filtering rule for the terminal 20 on the basis of input on the management screen through the display device 40. For example, the instruction unit 332 can transmit the terminal identification information and a transmission source address to be added to the gateway device 10. The instruction unit 332 can instruct the gateway device 10 to set the first filtering rule for the terminal 20 on the basis of input through instant message service.

Configuration of Display Device in First Embodiment

Figure 7:
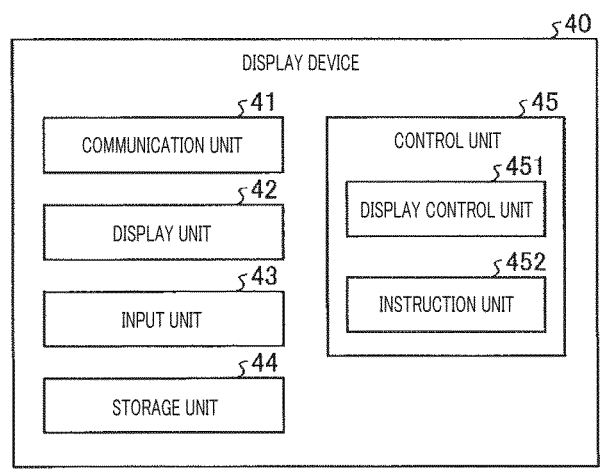
FIG. 7 is a diagram illustrating an example of a configuration of a display device according to the first embodiment.

Next, the configuration of the display device 40 is described with reference to FIG. 7. FIG. 7 is a diagram illustrating an example of the configuration of the display device according to the first embodiment. As illustrated in FIG. 7, the display device 40 includes a communication unit 41, a display unit 42, an input unit 43, a storage unit 44, and a control unit 45.

The communication unit 41 communicates data with another device through a network. For example, the communication unit 41 is a NIC. The communication unit 41 can communicate with the management device 30.

The display unit 42 displays a screen. For example, the display unit 42 is a display device. The input unit 43 is an interface device for receiving input from a user. For example, the input unit 43 is a mouse, a keyboard, and a touch panel.

The storage unit 44 is a storage device such as an HDD, an SSD, or an optical disc. The storage unit 44 may be a data rewritable semiconductor memory such as a RAM, a flash memory, or a NVSRAM. The storage unit 44 stores therein an OS and various kinds of programs executed by the gateway device 10. The storage unit 44 further stores therein various kinds of information used to execute the programs.

The control unit 45 controls the overall display device 40. For example, the control unit 45 is an electronic circuit such as a CPU or an MPU or an integrated circuit such as an ASIC or an FPGA. The control unit 45 has an internal memory for storing therein programs defining various processing procedures and control data, and executes the processing by using the internal memory. The control unit 45 functions as various processing units when various programs operate. For example, the control unit 45 includes a display control unit 451 and an instruction unit 452.

The display control unit 451 displays a management screen generated by the generation unit 331 in the management device 30 and transmitted to the display device 40 on the display unit 42. The instruction unit 452 transmits a setting instruction based on input from a user through the management screen displayed on the display unit 42 to the management device 30.

For example, the management screen in FIG. 8 is displayed on the display unit 42. In this case, when an add button on the management screen displayed on the display unit 42 is clicked, the instruction unit 452 instructs the setting to allow a packet for which the clicked transmission source address is set to be transferred to a terminal 20 identified by corresponding terminal identification information. For example, when a delete button on the management screen displayed on the display unit 42 is clicked, the instruction unit 452 instructs the deletion of the setting to allow a packet for which the clicked transmission source address is set to be transferred to a terminal 20 identified by corresponding terminal identification information.

When an all deny button is clicked, the instruction unit 452 instructs the setting to deny the transfer of all packets to a terminal 20 identified by corresponding terminal identification information. The setting to deny the transfer may be the deletion of a row for which "allow" is set as the operation.

Processing in First Embodiment

Figure 9:
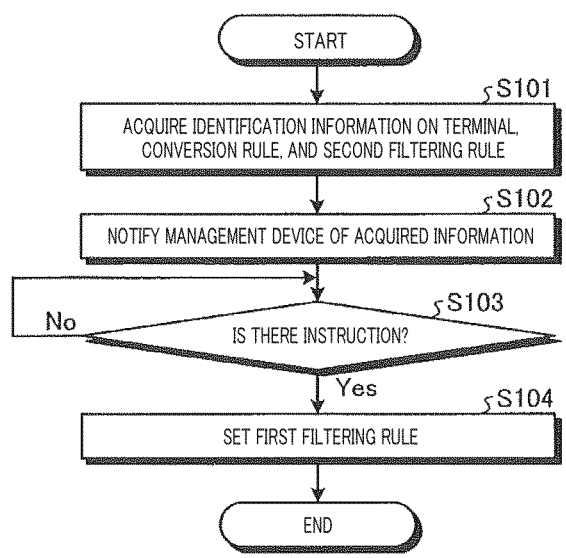
FIG. 9 is a flowchart illustrating the flow of setting processing in the gateway device according to the first embodiment.

Referring to FIG. 9, setting processing in the gateway device 10 is described. FIG. 9 is a flowchart illustrating the flow of setting processing in the gateway device according to the first embodiment. As illustrated in FIG. 9, first, the gateway device 10 acquires terminal identification information, a conversion rule, and a second filtering rule (Step S101). The gateway device 10 notifies the management device 30 of the acquired information (Step S102).

The gateway device 10 stands by for an instruction from the management device 30 (No at Step S103). When the gateway device 10 is instructed by the management device 30 (Yes at Step S103), the gateway device 10 sets a first filtering rule in accordance with the instruction (Step S104).

Figure 10:
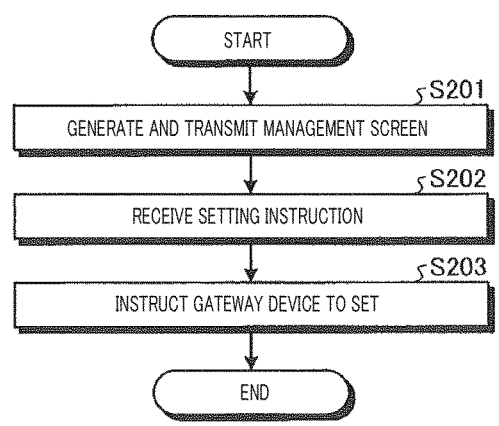
FIG. 10 is a flowchart illustrating the flow of instruction processing in the management device according to the first embodiment.

Referring to FIG. 10, instruction processing in the management device 30 is described. FIG. 10 is a flowchart illustrating the flow of instruction processing in the management device according to the first embodiment. As illustrated in FIG. 10, first, the management device 30 generates a management screen on the basis of information transmitted from the gateway device 10, and transmits the management screen to the display device 40 (Step S201).

The management device 30 receives a setting instruction from the display device 40 through the management screen (Step S202), and instructs the gateway device 10 to perform the setting based on the received instruction (Step S203).

Figure 11:
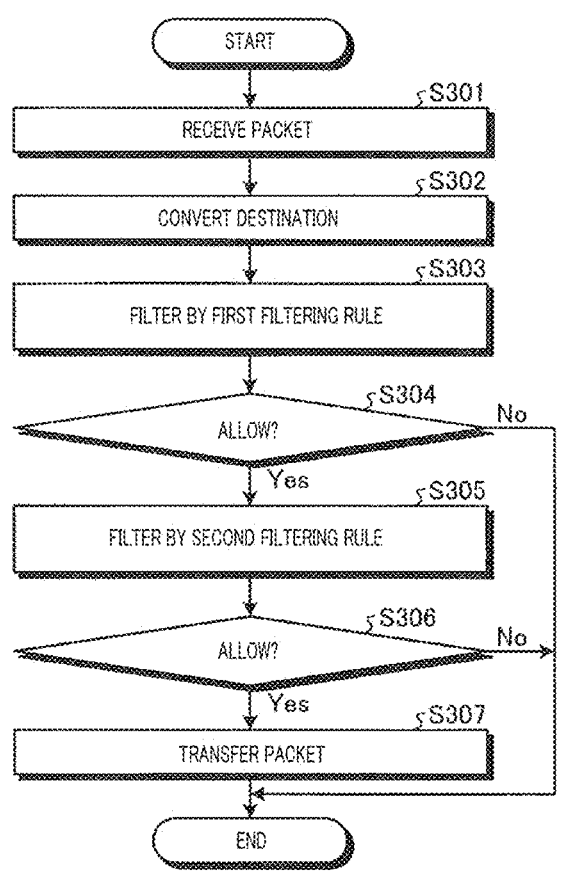
FIG. 11 is a flowchart illustrating the flow of transfer processing in the gateway device according to the first embodiment.

Referring to FIG. 11, transfer processing in the gateway device 10 is described. FIG. 11 is a flowchart illustrating the flow of processing of transfer from a first network to a second network in the gateway device according to the first embodiment. As illustrated in FIG. 11, first, the gateway device 10 receives a packet from the network 3 (Step S301). Next, the gateway device 10 refers to a destination conversion rule to convert the destination of the received packet as needed (Step S302).

The gateway device 10 filters the packet in accordance with the first filtering rule (Step S303). When the transfer of the packet is not allowed in accordance with the first filtering rule (No at Step S304), the gateway device 10 finishes the processing without transferring the packet.

On the other hand, when the transfer of the packet is allowed in accordance with the first filtering rule (Yes at Step S304), the gateway device 10 further filters the packet in accordance with the second filtering rule (Step S305).

When the transfer of the packet is not allowed in accordance with the second filtering rule (No at Step S306), the gateway device 10 finishes the processing without transferring the packet.

On the other hand, when the transfer of the packet is allowed in accordance with the second filtering rule (Yes at Step S306), the gateway device 10 transfers the packet to a terminal in the network 2 (Step S307).

Effects in First Embodiment

The management system 1 includes the gateway device 10 for filtering and transferring a packet between the network 2 and the network 3, and the management device 30 for managing the gateway device 10. The storage unit 12 stores therein a first filtering rule and a second filtering rule for filtering packets which are transmitted from a terminal 20 in the network 2 as a transmission source to a terminal 20 in the network 3 as a destination. The acquisition unit 131 acquires, on the basis of a packet transmitted from the terminal 20 in the network 3, identification information 122 for identifying the terminal 20. The notification unit 132 notifies the management device 30 of the identification information 122 on the terminal 20 acquired by the acquisition unit 131. The setting unit 133 sets a first filtering rule for the terminal 20 based on an instruction from the management device 30. The generation unit 331 generates a management screen for managing the first filtering rule for the terminal 20 on the basis of the identification information 122 on the terminal 20 notified from the notification unit 132, and transmits the generated management screen to a predetermined display device. The instruction unit 332 instructs the gateway device 10 to set the first filtering rule for the terminal 20 on the basis of input to the management screen through the display device 40.

In this manner, in this embodiment, the setting of the gateway device 10 is performed through the management device 30. In this embodiment, the management device 30 is not required to grasp an address to be set in advance. In addition, the second filtering rule can be set by an existing UPnP IGGD, and hence it is unnecessary to change specifications of existing terminals and gateway devices related to the UPnP IGD. Furthermore, a dedicated proxy for fixing an IP address at the access source for the terminal is not required to be prepared. Consequently, according to this embodiment, filtering rules for preventing unauthorized accesses can be easily set to a home gateway at low cost.

The notification unit 132 further notifies the management device 30 of a second filtering rule for the terminal 20. The generation unit 331 displays information on the second filtering rule notified from the notification unit 132 on the management screen. Consequently, according to this embodiment, the first filtering rule can be set while confirming the second filtering rule on the management screen.

The storage unit 12 further stores therein a conversion rule for converting the destination of a packet transmitted to the network 3 to a destination that can specify the terminal 20 in the network 3. The notification unit 132 further notifies the management device 30 of a conversion rule for the terminal 20. The generation unit 331 displays information on the conversion rule notified from the notification unit 132 on the management screen. Consequently, according to this embodiment, the first filtering rule can be set while confirming the transmission source and the destination after conversion on the management screen.

The setting unit 133 adds, on the basis of a packet transmitted from the terminal 20 of the network 3, a second filtering rule for allowing a packet of a particular having a particular protocol and a particular destination port number to be transferred to the terminal 20, and further adds a conversion rule for converting a destination address and a destination port number of a predetermined packet transmitted to the network 3 into the address and a particular destination port number of the terminal 20. Consequently, according to this embodiment, the conversion rule and the second filtering rule can be automatically set.

The acquisition unit 131 acquires, on the basis of a packet that is not allowed to be transferred to a terminal 20 in the network 3 in accordance with the second filtering rule, identification information 122 on the terminal 20 of the destination of the packet. The notification unit 132 notifies the management device 30 of the identification information 122 acquired by the acquisition unit 131 and a transmission source address of the packet. The generation unit 331 displays, on the management screen, a button for instructing the addition of the transmission source address notified from the notification unit 132 and a first filtering rule for allowing a packet transmitted from the transmission source address to be transferred. Consequently, according to this embodiment, the first filtering rule can be set on the management screen by intuitive operation.

The generation unit 331 may display, on the management screen, a button for instructing the addition of a first filtering rule for allowing the transfer of the packet transmitted from the address of the display device 40. In this case, the display device 40 is an example of a terminal in the first network.

The generation unit 331 displays reverse domain name system (DNS) lookup information or WHOIS information of a transmission source address for which the first filtering rule is managed on the management screen. Consequently, according to this embodiment, the first filtering rule can be set while confirming an ISP (Internet Service Provider) corresponding to the address on the management screen.

System Configuration, Etc.

The components in the illustrated devices are functionally conceptual, and are not necessarily required to be physically configured as illustrated. In other words, a specific mode for dispersion and integration of the devices is not limited to the illustrated one, and all or part of the devices can be functionally or physically dispersed and integrated in any unit depending on various kinds of loads, usage conditions, and any other parameter. In addition, all or any part of the processing functions executed by the devices may be implemented by a CPU and programs analyzed and executed by the CPU, or implemented by hardware by wired logic.

Among the processing contents described in the above-mentioned embodiments, all or part of the processing that is described as being automatically executed can also be manually executed, or all or part of the processing that is described as being manually executed can also be automatically executed by a known method. In addition, the processing procedure, the control procedures, the specific names, and the information including various kinds of data and parameters described herein and illustrated in the accompanying drawings can be freely changed unless otherwise specified.

Program

In one embodiment, the management device 30 can be implemented by installing a management program for executing the above-mentioned management on a desired computer as package software or online software. For example, by causing an information processing device to execute the above-mentioned management program, the information processing device can function as the management device 30. The information processing device as used herein includes a desktop or notebook personal computer. In addition thereto, the category of the information processing device includes mobile communication terminals such as mobile phones and PHS (Personal Handyphone Systems) and slate terminals such as PDA (Personal Digital Assistant).

Figure 12:
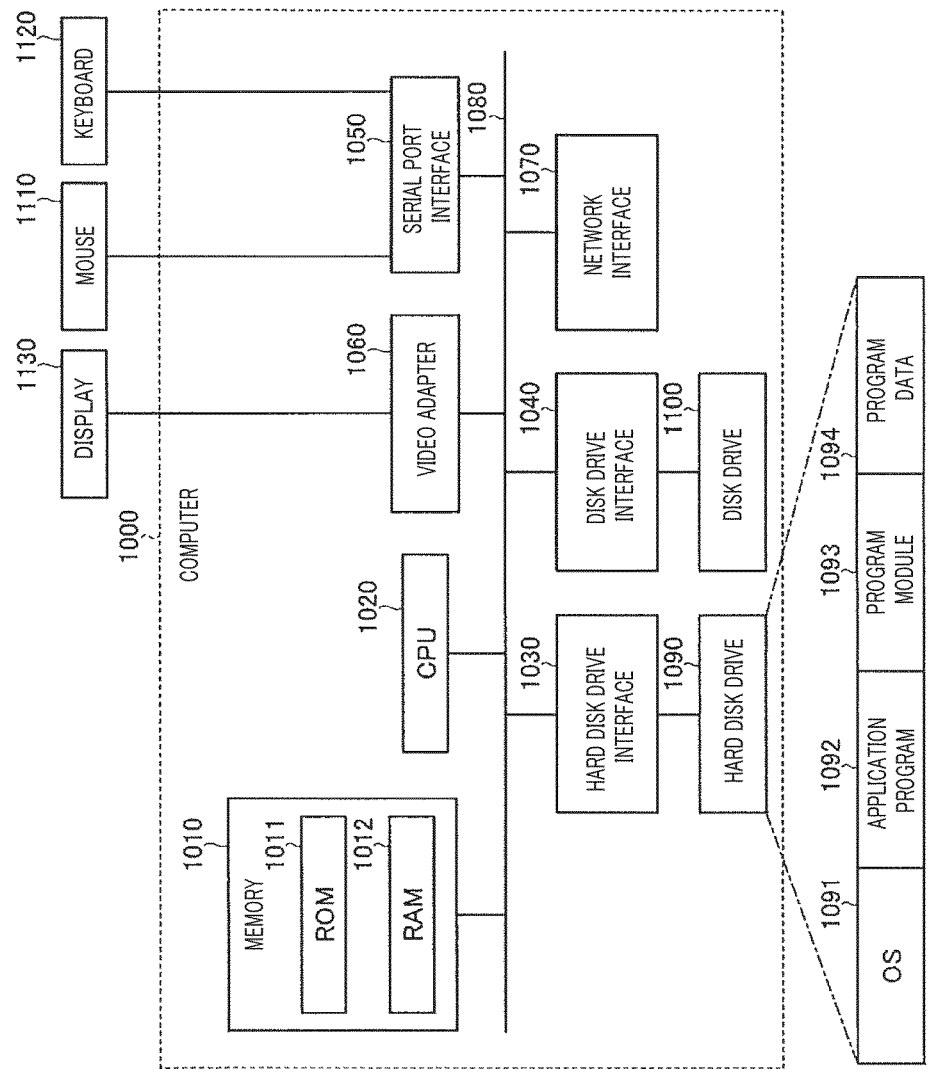
FIG. 12 is a diagram illustrating an example of a computer that functions as a gateway device or a management device for executing a management program.

FIG. 12 is a diagram illustrating an example of a computer that functions as a gateway device or a management device for executing the management program. For example, a computer 1000 includes a memory 1010 and a CPU 1020. The computer 1000 includes a hard disk drive interface 1030, a disk drive interface 1040, a serial port interface 1050, a video adapter 1060, and a network interface 1070. The units are connected by a bus 1080.

The memory 1010 includes a ROM (Read Only Memory) 1011 and a RAM 1012. For example, the ROM 1011 stores therein a boot program such as a BIOS (Basic Input Output System). The hard disk drive interface 1030 is connected to a hard disk drive 1090. The disk drive interface 1040 is connected to a disk drive 1100. For example, a removable storage medium such as a magnetic disk or an optical disc is inserted to the disk drive 1100. For example, the serial port interface 1050 is connected to a mouse 1110 and a keyboard 1120. For example, the video adapter 1060 is connected to a display 1130.

For example, the hard disk drive 1090 stores therein an OS 1091, an application program 1092, a program module 1093, and program data 1094. In other words, programs for defining processing in the gateway device 10 or the management device 30 are implemented as the program module 1093 in which computer-executable codes are written. For example, the program module 1093 is stored in the hard disk drive 1090. For example, the program module 1093 for executing the same processing as the functional configurations in the gateway device 10 or the management device 30 is stored in the hard disk drive 1090. The hard disk drive 1090 may be substituted by an SSD.

Setting data used for the processing in the above-mentioned embodiment is stored in, for example, the memory 1010 or the hard disk drive 1090 as the program data 1094. The CPU 1020 reads the program module 1093 and the program data 1094 stored in the memory 1010 and the hard disk drive 1090 onto the RAM 1012 as needed, and executes the processing in the above-mentioned embodiment.

The program module 1093 and the program data 1094 are not necessarily required to be stored in the hard disk drive 1090, and, for example, may be stored in a removable storage medium and read by the CPU 1020 through the disk drive 1100. Alternatively, the program module 1093 and the program data 1094 may be stored in another computer connected through a network (such as LAN and WAN). The program module 1093 and the program data 1094 may be read from another computer by the CPU 1020 through the network interface 1070.

REFERENCE SIGNS LIST

1 Management system
10 Gateway device
20 Terminal
30 Management device
40 Display device
11, 31, 41 Communication unit
12, 32, 44 Storage unit
13, 33, 45 Control unit
42 Display unit
43 Input unit
121 Conversion table
122 Identification information
123 First filtering table
124 Second filtering table
131 Acquisition unit
132 Notification unit
133 Setting unit
134 Transfer unit
331 Generation unit
332, 452 Instruction unit
451 Display control unit

The invention claimed is:
1. A management system, comprising:
gateway circuitry that filters and transfers a packet between a first network and a second network; and
management circuitry that manages the gateway circuitry,
wherein the gateway circuitry includes:
a memory that stores therein a first filtering rule and a second filtering rule to filter packets which are transmitted from a first terminal in the first network as a transmission source to a second terminal in the second network as a destination;
acquisition circuitry that acquires, based on a packet transmitted from the second terminal in the second network, identification information to identify the second terminal;
notification circuitry that notifies the management circuitry of the identification information on the second terminal acquired by the acquisition circuitry; and
setting circuitry that sets the first filtering rule for the second terminal based on an instruction from the management circuitry,
wherein the management circuitry includes:
generation circuitry that generates, based on the identification information on the second terminal notified from the notification circuitry, a management screen to manage the first filtering rule for the second terminal, and transmitting the generated management screen to a predetermined display device; and instruction circuitry that instructs the gateway circuitry to set the first filtering rule for the second terminal based on input to the management screen through the display device,
wherein the first filtering rule selectively refers further filtering to the second filtering rule,
wherein the second filtering rule indicates that transfer via the first filtering rule has already been allowed,
wherein the acquisition circuitry acquires, based on a packet that is not allowed to be transferred to the second terminal in the second network in accordance with the second filtering rule, identification information on the second terminal as the destination of the packet,
wherein the notification circuitry notifies the management circuitry of the identification information acquired by the acquisition circuitry and a transmission source address of the packet, and
wherein the generation circuitry displays, on the management screen, the transmission source address notified by the notification circuitry and a button to instruct addition of the first filtering rule to allow transfer of a subsequent packet transmitted from the transmission source address.

2. The management system according to claim 1, wherein the notification circuitry further notifies the management circuitry of the second filtering rule for the second terminal, and the generation circuitry displays information regarding the second filtering rule notified from the notification circuitry on the management screen.

3. The management system according to claim 1, wherein the memory further stores therein a conversion rule to convert a first destination convention of the packet to be transmitted to the second network to a second destination convention that enables specification of the second terminal in the second network,
the notification circuitry further notifies the management circuitry of the conversion rule for the second terminal, and
the generation circuitry displays information on the conversion rule notified by the notification circuitry on the management screen.

4. The management system according to claim 3, wherein the setting circuitry adds the second filtering rule to allow, based on the packet transmitted from the second terminal in the second network, a second packet having a particular protocol and a particular destination port number to be transferred to the second terminal, and further adds the conversion rule to convert a destination address and a destination port number of the second packet transmitted to the second network to an address and the particular destination port number of the second terminal.

5. The management system according to claim 1, wherein the generation circuitry displays, on the management screen, reverse domain name system (DNS) lookup information or WHOIS information on a transmission source address for which the first filtering rule is managed.

6. The management system according to claim 1, wherein the instruction circuitry instructs the gateway circuitry device to set the first filtering rule for the second terminal based on input through an instant message service.

7. A management method to be executed by a management system that includes gateway circuitry to filter and transfer a packet between a first network and a second network, the gateway circuitry including a memory that stores therein a first filtering rule and a second filtering rule to filter packets which are transmitted from a first terminal in the first network as a transmission source to a second terminal in the second network as a destination; and a management circuitry device to manage the gateway circuitry device, the management method comprising:
an acquisition step of acquiring, by the gateway circuitry, based on a packet transmitted from the second terminal in the second network, identification information to identify the second terminal;
a notification step of notifying, by the gateway circuitry, the management circuitry of the identification information on the second terminal acquired at the acquisition step;
a generation step of generating, by the management circuitry, a management screen to manage the first filtering rule for the second terminal based on the identification information on the second terminal notified at the notification step, and transmitting the generated management screen to a predetermined display device;
an instruction step of instructing, by the management circuitry, the gateway circuitry to set the first filtering rule for the second terminal based on input to the management screen through the display device; and
a setting step of setting, by the gateway circuitry, the first filtering rule for the second terminal based on an instruction from the management circuitry,
wherein the first filtering rule selectively refers further filtering to the second filtering rule,
wherein the second filtering rule indicates that transfer via the first filtering rule has already been allowed,
wherein the acquisition circuitry acquires, based on a packet that is not allowed to be transferred to the second terminal in the second network in accordance with the second filtering rule, identification information on the second terminal as the destination of the packet,
wherein the notification circuitry notifies the management circuitry of the identification information acquired by the acquisition circuitry and a transmission source address of the packet, and
wherein the generation circuitry displays, on the management screen, the transmission source address notified by the notification circuitry and a button to instruct addition of the first filtering rule to allow transfer of a subsequent packet transmitted from the transmission source address.

8. The management system according to claim 1, wherein the notification circuitry further notifies the management circuitry of the second filtering rule for the second terminal, and the generation circuitry displays information regarding the second filtering rule notified from the notification circuitry on the management screen,
the memory further stores therein a conversion rule to convert a first destination convention of the packet to be transmitted to the second network to a second destination convention that enables specification of the second terminal in the second network,
the notification circuitry further notifies the management circuitry of the conversion rule for the second terminal,
the generation circuitry displays information on the conversion rule notified by the notification circuitry on the management screen, and
the setting circuitry adds the second filtering rule to allow, based on the packet transmitted from the second terminal in the second network, a second packet having a particular protocol and a particular destination port number to be transferred to the second terminal, and further adds the conversion rule to convert a destination address and a destination port number of the second packet transmitted to the second network to an address and the particular destination port number of the second terminal.

9. The management system according to claim 1, wherein the gateway circuitry is part of a Universal Plug and Play (UPnP) Internet Gateway Device (IGD),
the first filtering rule is set by a user via the management circuitry, the first filtering rule including correspondence between a protocol, the transmission source address, a destination port number, and an operation, and
the first filtering rule, for the filtering thereof, is searched in order, by the gateway circuitry, from a top-most row of the first filtering rule.

10. The management system according to claim 9, wherein the first filtering rule is set such that a malicious packet for a malicious address published as a black list is denied.

11. The management method according to claim 7, wherein
the notification step further notifies the management circuitry of the second filtering rule for the second terminal, and the method further comprises:
displaying information regarding the second filtering rule notified from the notification circuitry on the management screen.

12. The management method according to claim 7, further comprising:
storing, in the memory, a conversion rule to convert a first destination convention of the packet to be transmitted to the second network to a second destination convention that enables specification of the second terminal in the second network;
notifying the management circuitry of the conversion rule for the second terminal; and
displaying information on the conversion rule notified by the notification circuitry on the management screen.

13. The management method according to claim 12, further comprising:
adding the second filtering rule to allow, based on the packet transmitted from the second terminal in the second network, a second packet having a particular protocol and a particular destination port number to be transferred to the second terminal; and
adding the conversion rule to convert a destination address and a destination port number of the second packet transmitted to the second network to an address and the particular destination port number of the second terminal.

14. The management method according to claim 7, wherein the method further comprises:
the notification circuitry further notifying the management circuitry of the second filtering rule for the second terminal, and the generation circuitry displays information regarding the second filtering rule notified from the notification circuitry on the management screen;
the memory further storing therein a conversion rule to convert a first destination convention of the packet to be transmitted to the second network to a second destination convention that enables specification of the second terminal in the second network;
the notification circuitry further notifying the management circuitry of the conversion rule for the second terminal;
the generation circuitry displaying information on the conversion rule notified by the notification circuitry on the management screen; and
the setting circuitry adding the second filtering rule to allow, based on the packet transmitted from the second terminal in the second network, a second packet having a particular protocol and a particular destination port number to be transferred to the second terminal, and further adding the conversion rule to convert a destination address and a destination port number of the second packet transmitted to the second network to an address and the particular destination port number of the second terminal.

15. The management method according to claim 7, wherein
the gateway circuitry is part of a Universal Plug and Play (UPnP) Internet Gateway Device (IGD),
the first filtering rule is set by a user via the management circuitry, the first filtering rule including correspondence between a protocol, the transmission source address, a destination port number, and an operation, and
the first filtering rule, for the filtering thereof, is searched in order, by the gateway circuitry, from a top-most row of the first filtering rule.

16. The management method according to claim 15, wherein the first filtering rule is set such that a malicious packet for a malicious address published as a black list is denied.

* * * * *